United States Patent [19]
Eigeldinger et al.

[11] Patent Number: 5,434,715
[45] Date of Patent: Jul. 18, 1995

[54] PROCESS AND DEVICE FOR COPYING MAGNETIC TAPES CONTAINING BOTH PROGRAM MATERIAL AND CONTROL DATA

[75] Inventors: Norbert Eigeldinger, Villingen; Michael Bildl, Pfohren, both of Germany

[73] Assignee: Deutsche Thomson-Brandt GmbH, Villingen-Schwenningen, Germany

[21] Appl. No.: 93,298

[22] Filed: Jul. 16, 1993

Related U.S. Application Data

[63] Continuation of Ser. No. 857,403, Mar. 24, 1992, abandoned.

[30] Foreign Application Priority Data

Aug. 25, 1989 [DE] Germany ............... 39 28 190.6
Aug. 26, 1989 [DE] Germany ............... 39 32 059.6

[51] Int. Cl.$^6$ ................................ G11B 5/86
[52] U.S. Cl. .................................... 360/15
[58] Field of Search ............. 360/15, 14.2, 14.3; 369/83, 84, 85

[56] References Cited

U.S. PATENT DOCUMENTS 4,510,535  4/1985  Tokumitsu .................. 360/14.2
4,841,503  6/1989  Yamada et al. .............. 360/15
4,887,170  12/1989  Tsuchida et al. ............ 360/15
5,177,619  1/1993  Sato ...................... 360/14.1 X

OTHER PUBLICATIONS

Japanese Patent Abstract vol. 12, No. 220 (P-720), Takeuchi, Jan. 21, 1988.
Japanese Patent Abstract vol. 10, No. 259 (E-434), Hikishima, Apr. 28, 1986.

*Primary Examiner*—Andrew L. Sniezek
*Attorney, Agent, or Firm*—Joseph S. Tripoli; Joseph J. Laks; Francis A. Davenport

[57] ABSTRACT

A method of copying magnetic tapes having a message information track and a control track with supplementary information formatted as a digital word encoded as a plurality of successive data bits. The method includes the steps of playing the tape and reproducing the message track and the control track. The message information is coupled to a second playback/record device for recording. The plurality of successive data bits reproduced from the control track is stored in a digital memory to decode the digital word. The stored digital word is transferred to the second playback/record device and is reencoded as a plurality of successive data bits and recorded in the control track of the second playback-/record device.

1 Claim, 3 Drawing Sheets

PROCESS AND DEVICE FOR COPYING MAGNETIC TAPES CONTAINING BOTH PROGRAM MATERIAL AND CONTROL DATA

This is a continuation of application Ser. No. 07/857,403, filed Mar. 24, 1992 now abandoned.

This is a continuation of PCT application PCT/EP 90/01360 filed Aug. 18, 1990 by Norbert Eigeldinger and Michael Bildl and titled "Process And Device For Copying Magnetic Tapes".

This invention is directed to a method and system for copying magnetic tapes particularly audio, video or data magnetic tapes containing both program and control data.

BACKGROUND OF THE INVENTION

With conventional tape copying methods, the information contained on a prerecorded tape is reproduced by a tape-playing device and transmitted via a transmission path to a recording device and recorded on another tape. Ideally, at the end of the tape copying process the same information is contained on both the newly recorded tape and the original tape. Supplementary information which, with certain recording standards—for example, the VHS standard—is used for the internal control of the playback operation and which is recorded in addition to the actual information on the original tape is not copied. The control information is generated during the initial recording for use during replay to synchronize the switch over between several scanning heads. The control, or synchronization, pulses are recorded on a longitudinal track, called a control track (CTL), which is parallel to the tape edge. The control pulses consist of sharp magnetic transitions from north to south or from south to north. Accordingly, two successive transitions in the same direction establish a definite time span of, for example, 40 msec, during the recording. The transitions in the other direction are not required for synchronization and can therefore, within certain limits, be varied in their relative positions within the 40 msec time span, without impairing the original synchronization function of the control track.

The ability to vary the relative positions of the south to north transitions can be used for digital coding. Such a use is made in the VHS standard in order to enable magnetic marks to be positioned on the magnetic tape—for instance, for the precise image location of particular points in a recording. For that reason, there are two types of marks, the so-called VISS (VHS index search system) mark which represents unchangeable digital information, and the so-called VASS (VHS address search system) mark which contains an individual address in digitally coded form.

When a relatively short program message is recorded on a long tape it is advantageous to simultaneous mark the start of a recorded material, for the purpose of exactly locating the beginning of the material in the playback mode. If a prerecorded tape containg such marks is copied, using prior art copying methods, only the message information is recorded. The location marks are not transfered and recorded since they are located in a region of the replay tape which is provided for internal device playback mode control purposes and cannot be accessed or utlized by the user.

SUMMARY OF THE INVENTION:

A method of copying magnetic tapes having a message information track and a control track with supplementary information formatted as a digital word encoded as a plurality of successive data bits. The method includes the steps of playing the tape and reproducing the message track and the control track. The message information is coupled to a second playback/record device for recording. The plurality of successive data bits reproduced from the control track is stored in a digital memory to decode the digital word. The stored digital word is transferred to the second playback/record device, is reencoded as a plurality of successive data bits and is recorded in the control track of the second playback/record device.

DETAILED DESCRIPTION

Figure 1:
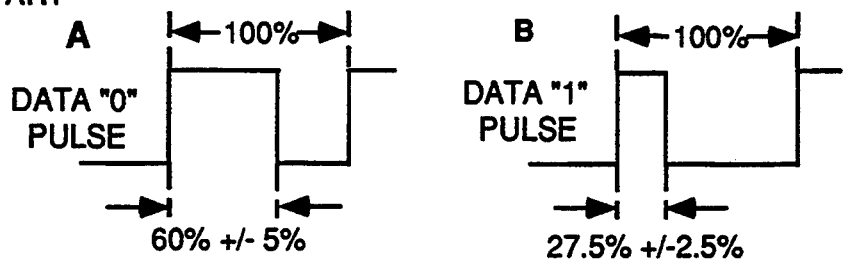
FIG. 1 shows the digital coding which can be used for the control track of a VHS video recorder.

The VHS control track standard for VISS and VASS data encoding is shown in FIG. 1, where 100% represents the 40 msec time or window or repetition period, between two consecutive positive edges (which correspond to north-to-south magnetic transitions) of the VHS standard for the 625 lines/50 Hz/PAL television standard.

When operating in the 625 line 50 Hz television standard the control track pulse signal has a 40 millisecond repetition period. Thus in one second 25 may be recorded or replayed. The negative transition shown in FIG. 1 may be varied in position or timing responsive to consecutive bits of data. For example in FIG. 1A, a digital bit "0" is coded when the negative edge (a south-to-north magnetic transition) appears between the two positive edges in the range 60%±5%. FIG. 1B shows the coding of a digital "1" bit when the negative edge is in the range 27.5%±2.5%. Thus by utilizing width modulation of the control track pulse trailing edge, data may be communicated at a rate of 25 bits per second.

Figure 2:
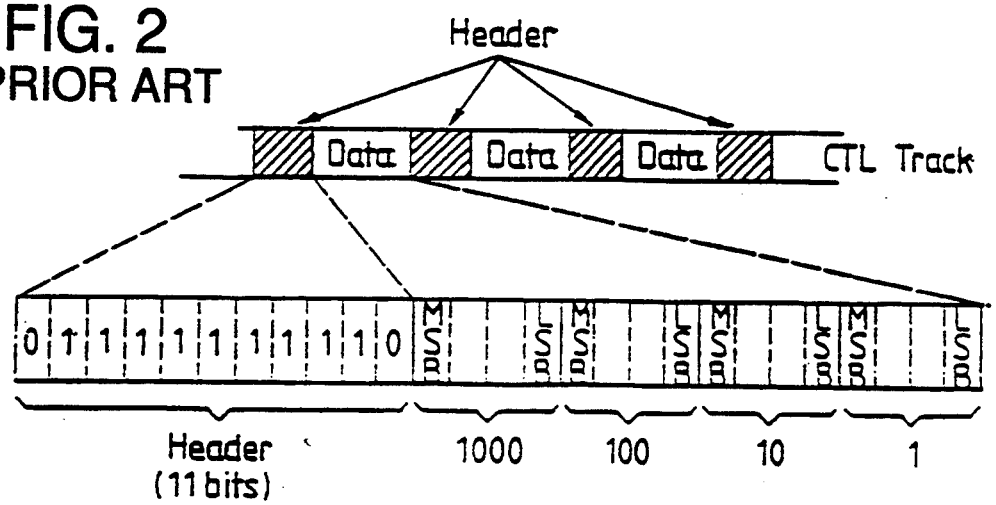
FIG. 2 shows the format of an address code.

FIG. 2 shows the format of a VASS or address code recorded on the control track of a VHS magnetic tape. The address code consists of four headers each of which is made up of eleven bits. A data word is inserted between each pair of headers. The data word consists of four BCD digits which themselves are each made up of four bits. As shown in FIG. 2, each header includes a first bit "0", followed by nine bits "1", and ends with a bit "0". The BCD data words are formatted in the recording direction whereby of the four bits forming one BCD digit, the bit with the highest value is first. Also, the weight of the four BCD digits is defined as thousands, hundreds, tens and units, depending on the recording direction. The initial "0" of the first header in the recording direction serves as a reference position.

Figure 3:
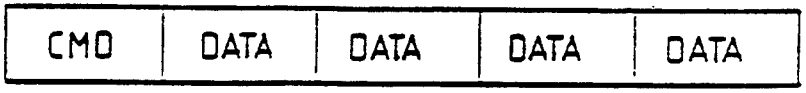
FIG. 3 shows an infrared transmission format.

An infrared transmission format is shown in FIG. 3 which is inventively used for transmitting address or index information between video recorders. The address consists of four BCD digits, formatted as described with reference to FIG. 2. Accordingly, the numerical range from 0000 to 9999 is available. Each of these digits is symbolically represented by "DATA" in FIG. 3, and each can have different values. A command word CMD is placed before the BCD digits to provide information about what type of data is to be sent or received. An infrared IC for example, type M 50467 manufactured by the Mitsubishi Electric Corporation, 2-3 Marunouchi, Tokyo, Japan may be used for transmitting the data. The M 50467 infrared transmitter IC, may transmit data using a carrier of approximately 38 KHz which is encoded using well known methods. It is well known that such an encoded carrier method is capable of transmitting data at rates in excess of 1000 bits per second.

Thus an infrared transmitter IC is employed to generate a format corresponding to the transmission format shown in FIG. 3.

Figure 4:
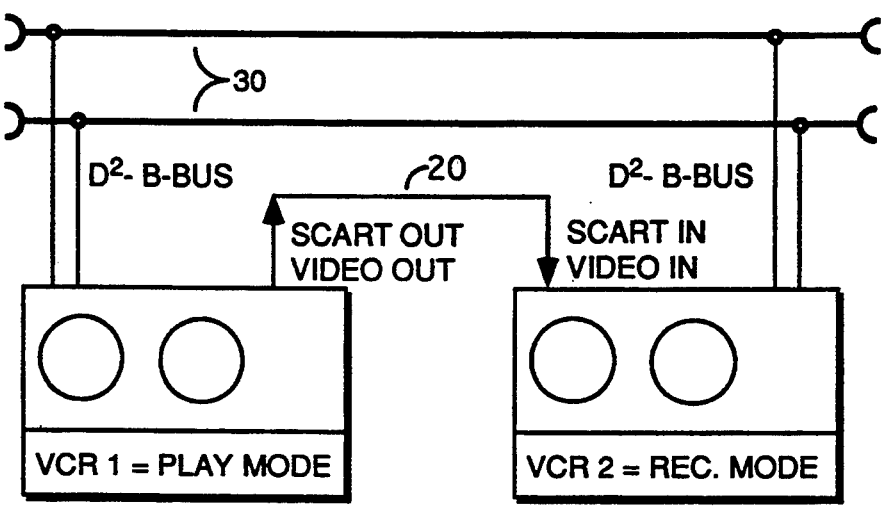
FIG. 4 is a preferred embodiment of a system which operates according to the inventive method.

In FIG. 4, a first video recorder VCR1 is in the playback mode and a second video recorder VCR2 in the recording mode. The two recorders VCR1, VCR2 are connected together by a line 20 which can be a SCART or video link. Picture and sound are transmitted in the typical manner from video recorder VCR1 to the other recorder VCR2 via line 20. Also, both video recorders VCR1, VCR2 are connected to a $D^2B$ data bus 30 through which they can exchange data and commands with each other according to the standard determined by the IEC. The $D^2B$ bus is specified by the International Electrotechnical Commission (IEC) in a pamphlet designated "Project No. 84.12.05001" (edition June 1988).

Other types of data bus can be used in lieu of the $D^2B$ bus. For example, the free pins of the SCART connection 20 can be used with the digital values "0" and "1" represented by zero and five volts respectivly.

The first recorder VCR1, includes a recording/playback head "CTL head" which is allocated to the control track. During playback of the tape the associated coder/decoder electronics of VCR1 recognizes digital data from the control track, for example, data corresponding to VISS or VASS search marks. The associated encoder/decoder electronics include a buffer memory which is used to temporarily store the replayed data bits from the control track to decode the data word corresponding to a VISS or a VASS address. Thus the stored data word may be communicated beyond the replay VCR by a variety of methods and means. With the invention the search mark data are transmitted serially, bit by bit over the $D^2B$ bus to the second video recorder VCR2 where they are recorded by means of the VCR2 CTL head and the associated encoder/decoder electronics. The search mark data are recorded in a digitally coded form along with the control track at the next possible opportunity during the recording process.

Index or address data can be transmitted from the playback device to the recording device serially, bit by bit, via a $D^2B$ bus. Such serial transmission occupies the data bus for the duration of the message, which may represent a few seconds for the address code format shown in FIG. 2. However, it can also be devised that the $D^2B$ bus is used for transmitting the complete data words according to the previously mentioned infrared transmission format shown in FIG. 3. The infrared format offers the advantage over the continuous serial transmission format in that it loads or occupies the bus for only short intervals and thus is to be preferred to continuous serial transmission.

Irrespective of which transmission method is used, the temporal offset between the picture/sound information and the VISS or VASS marks recorded on the copy will be different from the temporal offset of the original recording. However, this offset is relatively minor and does not create a problem. For either transmission method and also for an occupied or a free transmission path, the offset can be in the order of one second or a couple of seconds. Compared to conventional copying methods, with which the marks cannot be transmitted and thus must be located and manually input to the copy using a keyboard such a small temporal offset is acceptable. However, should the exceptional case arise where the offset is visually disturbing it is possible to devise a system which automatically searches out the marks in the control track of the copy during a playback mode and to record a new offset. In such an instance the "old" mark is written over and need not be deleted separately.

Figure 5:
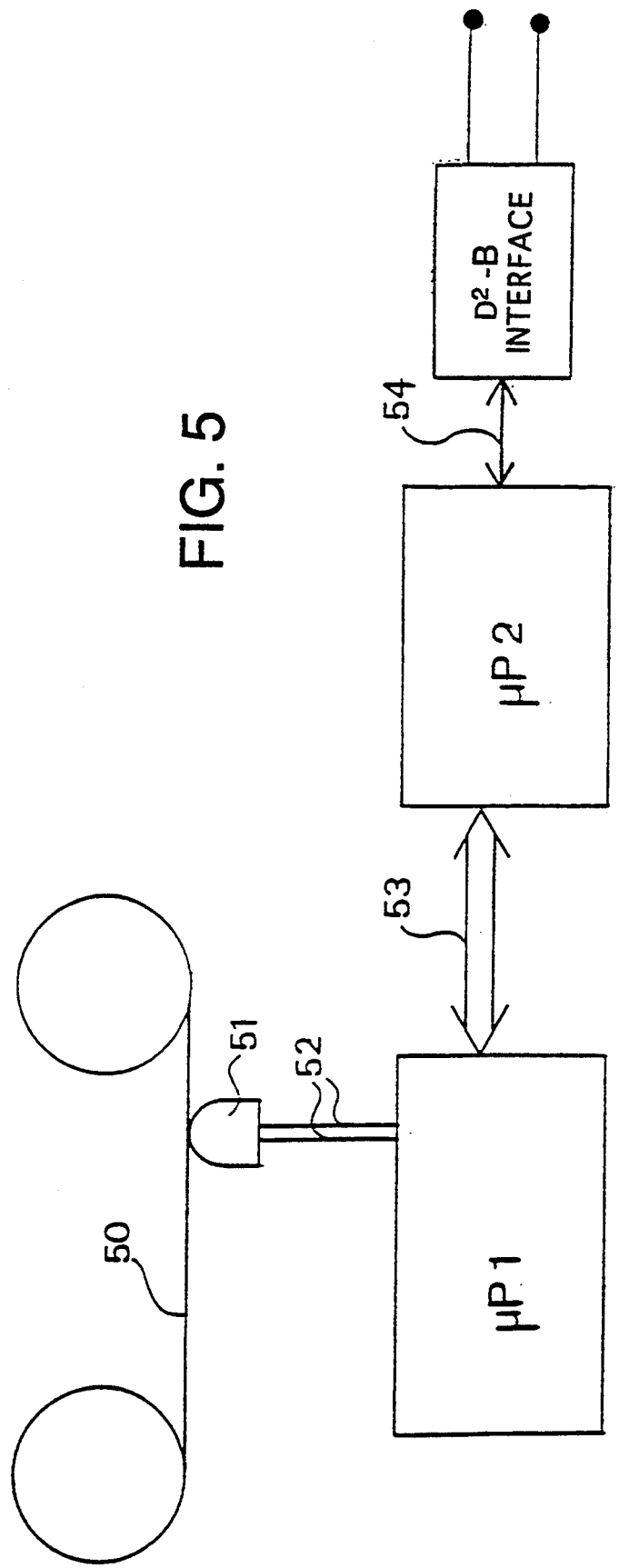
FIG. 5 shows some details of the system of FIG. 4.

An example of the video recorder VCR1 in FIG. 4 which is used for playback is shown in FIG. 5. The data contained in the control track of the tape 50 to be copied, for example, VISS or VASS data, can be read and processed and further transmitted as necessary. The recording/playback head (CTL head) 51 of the recorder VCR1 associated with the control track of the tape 50 reads out the data contained in the control track during the playback mode. These data are input to a servo processor $\mu P1$ which further processes the control information according to the recording processing standard programmed into the processor, for example the VHS standard. Accordingly, the control of the video heads of the recorder VCR1 by the data from the control track is guaranteed. The tape mark data are transmitted from the servo processor $\mu P1$ via a serial interface 53, to a keyboard processor $\mu P2$ which reads and edits the data. The keyboard processor $\mu P2$ controls a display unit with which the marks can be indicated, for instance as decimal numbers or as alphanumeric characters. Also, the storing of tape marks for the video recorder VCR2 recording mode can also be controlled by the keyboard processor $\mu P2$. The tape mark data are preprocessed in the keyboard processor $\mu P2$ according to the bus protocol which is to be transmitted by the $D^2B$ bus, or other bus system which is provided. The keyboard processor $\mu P2$ also controls the transfer of the codes regarding the tape marks to or from a $D^2B$ interface via a line 54 which is connected to the $D^2B$ bus 30 (FIG. 4) via a line 55.

The codes are transmitted by $D^2B$ bus 30 to the video recorder VCR2 which is provided for the recording, FIG. 4. The data are recorded on the control track of the tape in the video recorder VCR2 in a form inverted from that in video recorder VCR1. Any additional control data which is generated by the servo processor in recorder VCR1 is also transferred by means of the CTL head of the video recorder VCR2. The $D^2B$ interface and $D^2B$ bus are examples only for other interface and bus systems can also be used. For example, the $I^2C$ bus system and the RS232 interface can be used.

Figure 6:
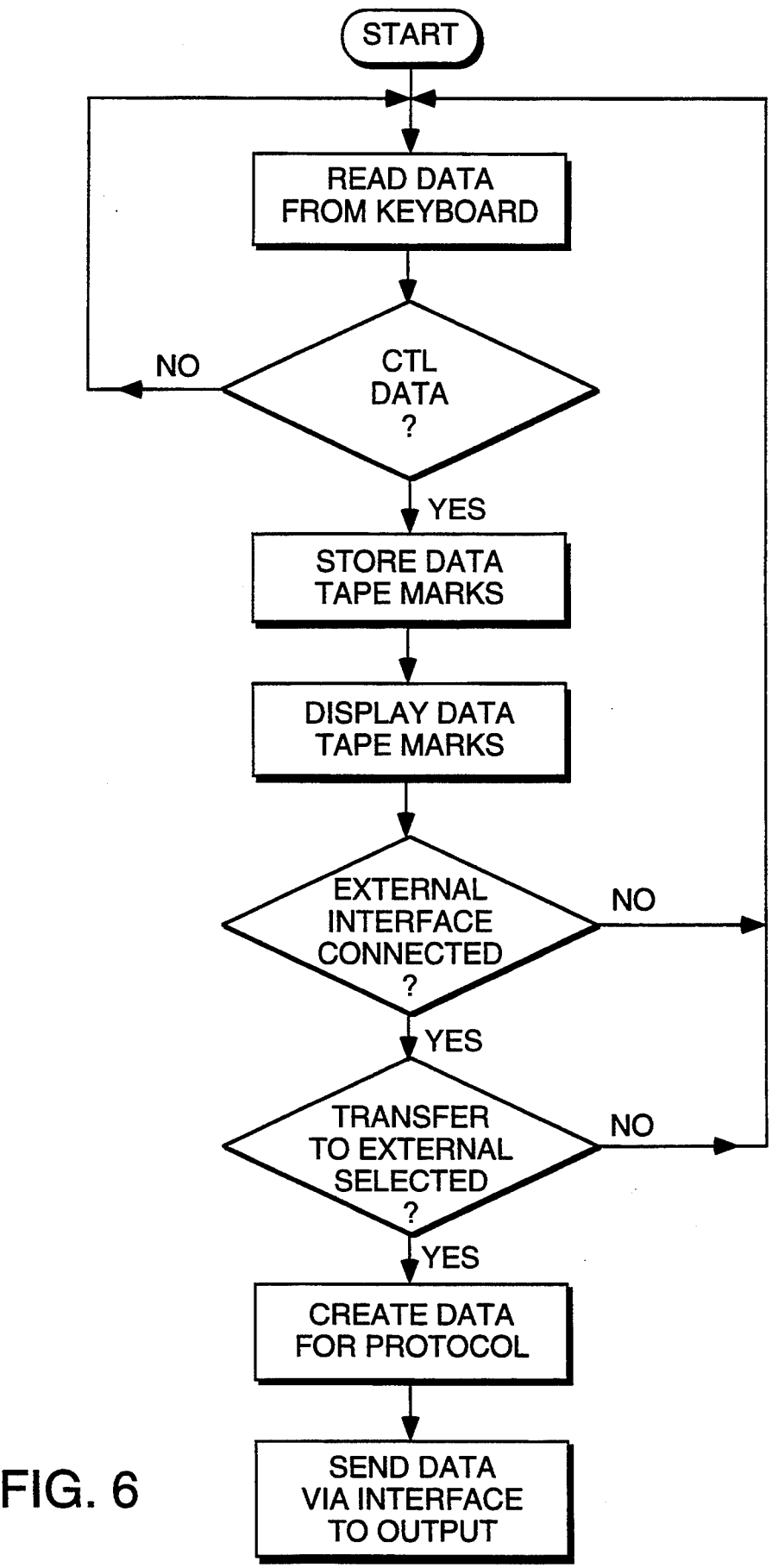
FIG. 6 is a flow chart of the operational program of the system shown in FIG. 5.

A flow chart of a program for the keyboard processor $\mu P2$ is shown in FIG. 6, as an example of operating a video recorder VCR1 as a playback device. An appropriate program is also provided for the recording mode, needed for the video recorder VCR2 in FIG. 4. It should be understood that the video recorders VCR1 and VCR2 preferably are equipped for both the playback and recording modes of operation.

At the initial point of the program shown in FIG. 6, the condition of the control keyboard of the video recorder VCR1 is read. Then a check is made to establish whether the track read by the CTL head contains data which represent tape marks "CTL DATA?". If it does not a return to the initial point is executed. When it does, the data are stored as tape marks and indicated on a display unit.

Next, a check is made to determine whether an external interface is connected to the video recorder VCR1 by the bus 30. If not a return to the initial point is executed. If one is, a check is made to establish whether a transmission type of operation regarding the external device has been selected "Transfer to external selected?". If not the return to the initial point is executed. If it has, the data for the transmission protocol are created and finally output to the D²B bus circuitry via the D²B interface of the video recorder VCR1. The program then restarts after a return to the initial point.

We claim:

1. A method of copying a first magnetic tape having a message information track and a control track having supplementary information formatted as successive digital words, each encoded as a plurality of successive data bits, comprising the steps of:

reproducing said message information and said supplementary information from said tracks of said first tape with a first playback/record device and recording said message information on a second tape with a second playback/record device;

decoding said plurality of successive data bits by storing said plurality of successive data bits in a digital memory as said successive digital words;

transmitting the stored digital words from said memory to said second playback/record device in a time interval shorter than the time interval required for decoding said encoded plurality of successive data bits; and, encoding each of said transmitted digital words as said plurality of successive data bits, for recording on a control track of said second tape.

* * * * *